United States Patent [19]

Kasanami et al.

[11] 4,302,736
[45] Nov. 24, 1981

[54] ELECTRICAL COMPOSITE PART

[75] Inventors: Tohru Kasanami, Kyoto; Toshiaki Ikeda, Osaka; Tetsuya Murakawa, Fukui; Toshimi Kaneko, Sabae, all of Japan

[73] Assignee: Murata Manufacturing Co., Ltd., Japan

[21] Appl. No.: 84,304

[22] Filed: Oct. 12, 1979

[30] Foreign Application Priority Data

Oct. 18, 1978 [JP] Japan .......................... 53/143562[U]

[51] Int. Cl.³ .......................... H03H 1/02; H03H 7/01
[52] U.S. Cl. .................................... 333/172; 333/184; 333/185; 338/333
[58] Field of Search ............... 333/172, 184, 185, 181, 333/182, 167, 12, 19, 20, 24 R, 24 C; 29/620, 610, 621; 455/339; 338/322–328, 333; 361/301–307, 321

[56] References Cited

U.S. PATENT DOCUMENTS 2,812,471 11/1957 Jarboe .................................. 29/620

Primary Examiner—Marvin L. Nussbaum
Attorney, Agent, or Firm—Ostrolenk, Faber, Gerb & Soffen

[57] ABSTRACT

A disc type composite part for use in electrical and electronic equipment which includes a disc substrate of ceramic dielectric material having a through-opening formed at its central portion, a first electrode and a second electrode respectively provided adjacent to the outer periphery and around the through-opening on one surface of the substrate, a third electrode provided on the other surface of the substrate, a shortcircuiting member for selectively shortcircuiting the third electrode with the first or second electrode, resistor elements connected for bridging between the first and second electrodes so as to extend over the one surface of the substrate without following the diametrical direction of the substrate, and an electrically insulating covering layer formed at least on the one surface of the substrate.

12 Claims, 10 Drawing Figures

ELECTRICAL COMPOSITE PART

BACKGROUND OF THE INVENTION

The present invention generally relates to an electrical component and more particularly, to a disc type capacitance-resistance or CR composite part for use in electrical or electronic equipment, for example, a television receiving set of a type having no transformer.

In FIG. 1 showing one example of the construction of a television receiving set of the transformerless type employing a disc type CR composite part. The television receiving set G generally includes a housing or cabinet H, a rear side cover Ha, a cathode ray tube CRT mounted on the upper front portion of the housing H for viewing, an inner chassis Ch disposed at the bottom of the housing H and serving for the grounding of electrical circuits, a tuner T accommodated in the front portion of the inner chassis Ch and having a knob K extending outwardly towards the front side of the housing H, an unbalanced type coaxial cable U drawn out from the input side of the tuner T, and an antenna connecting connector J mounted on the rear side cover Ha together with a shield chassis S having a disc type CR composite part D attached to the lower part thereof, with the end of the coaxial cable U being passed through a through-opening Do formed in the CR composite part D to be fixed thereat for maintaining the inner chassis Ch and connector J in an insulated state from each other in terms of low frequency, and in a coupled state to each other in terms of high frequency.

Conventionally, the disc type CR composite part D employed in the television receiving set as mentioned above has the construction as described hereinbelow with reference to FIGS. 2(A) to 2(C), and includes a disc-like base plate or substrate Db of ceramic dielectric material having a through-opening or through-hole Do formed at the central portion thereof, first and second electrode layers E1 and E2 respectively provided adjacent to the peripheral edge and around the through-opening Do of the substrate Db on one surface of said substrate, a pair of resistor members R provided in the diametrical direction as shown in FIG. 2(A) so as to connect for bridging the electrode layers E1 and E2, and a third electrode layer E3 provided on the other surface (FIG. 2(B)) of the substrate Db, while the electrode E3 and the first electrode layer E1 or second electrode layer E2 are shorcircuited to each other through proper shortcircuiting means, for example, by a shortcircuiting electrode Es provided in the through-opening Do as shown in FIGS. 2(A) to 2(C) or by another shortcircuiting electrode (not shown) provided on the peripheral edge of the substrate Db, or by attaching a separate metallic piece (not shown) between said electrode layers for constituting the CR composite part having an equivalent circuit as shown in FIG. 3. For actual application, electrically insulative covering layers M made of known material such as epoxy resin and the like are further applied onto the substrate Db (at least to the one surface of the substrate Db on which the first and second electrode layers E1 and E2 and the resistor members R are provided).

The known disc type CR composite part D as described in the foregoing has certain disadvantages in that its withstand voltage or voltage resistance characteristics are not very favorable. For example, upon measurements of A.C. breakdown voltage value on sample CR composite parts of the above known type (capacity $\approx$ 1800 PF and resistance $\approx$ 2 M$\Omega$) having the dielectric substrate diameter of 20 mm$\phi$, and distance of 3.5 mm between the first and second electrodes E1 and E2, and having insulating covering layers of epoxy resin on the opposite surfaces of the substrate, the resultant average measured value for twenty samples was only about 3.0 KV. This value is not considered to be sufficient for withstanding the flame tests of CSA (Canadian Standards Association) standards (3 KV A.C. voltage impression for 1 minute). When each of the sample CR composite parts was carefully examined after being subjected to an A.C. breakdown voltage, it was found that the electrical discharge in said voltage impression mainly took place at the resistor members R connected in the diametrical direction between the first and second electrodes E1 and E2. The above state is considered to be attributable to the fact that, while the degree of insulation may be improved due to a comparatively favorable close adhesion between the portion of the dielectric substrate Db located between the first and second electrodes E1 and E2 and the insulative covering layer M, the adhesion between the resistor members R and insulative covering layer M is not very good, with consequent formation of fine gaps therebetween, thus resulting in reduction of the electrical insulation. More specifically, the phenomenon as described above may be ascribed to the fact that, although the surface of the dielectric substrate Db is comparatively rough, the surfaces of the resistor members R are mostly smooth.

Moreover, in the known CR composite part D as described above, since the resistor members R connected between the first electrode layer E1 and second electrode layer E2 are disposed in the diametrical direction of the substrate Db through the shortest distance on said substrate Db, the length d (FIG. 2(A)) of each of the resistor members is consequently small, making it necessary to employ a material having a high resistance value per unit area, making it difficult to obtain CR composite parts with a stable quality.

SUMMARY OF THE INVENTION

Accordingly, an essential object of the present invention is to provide an improved disc type CR composite part for use in electrical and electronic equipment which is superior in withstand voltage characteristics through improved electrical insulation.

Another important object of the present invention is to provide an improved disc type CR composite part of the above described type in which, between a first and a second electrode layers respectively provided adjacent to the peripheral edge and around a central through-hole of a ceramic dielectric substrate for the CR composite part, resistor members are connected for bridging so as not to be directed in the diametrical direction of said substrate.

A further object of the present invention is to provide an improved disc type CR composite part of the above described type which is simple in construction and stable in functioning, and can be readily manufactured on a large scale at low cost.

In accomplishing these and other objects, according to one preferred embodiment of the present invention, there is disclosed a disc type CR composite part for use in electrical and electronic equipment which comprises a substrate of ceramic dielectric material having a through-opening formed at its central portion. On one surface of the substrate a first electrode and a second electrode respectively are provided adjacent to the outer periphery and around the through-opening. A third electrode is provided on the other surface of said substrate. Means are provided for selectively shortcircuiting the third electrode with the first or second electrode. Resistor elements are connected between the first and second electrodes so as to extend over the one surface of the substrate without following the diametrical direction of the substrate, and an electrically insulative covering layer is formed at least on the one surface of said substrate.

In practice, to incorporate the whole assembly of the disc type composite part into a television receiving set or the like, the composite part may be mounted in a cylindrical metallic housing at the lower portion of which the composite part is accommodated in a position above an opening formed in the bottom of said cylindrical housing, with the first electrode layer being soldered to said cylindrical housing which serves as one terminal, while a central tube extending through the through-opening of the composite part and the opening formed at the bottom of the cylindrical housing is soldered to the short circuit means for serving as the other terminal.

In accordance with the present invention, an improved disc type CR composite part is provided. This CR composite component is superior in withstanding voltage breakdowns because of good electrical insulation. Disadvantages inherent in the conventional CR composite parts of this kind have been substantially eliminated.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
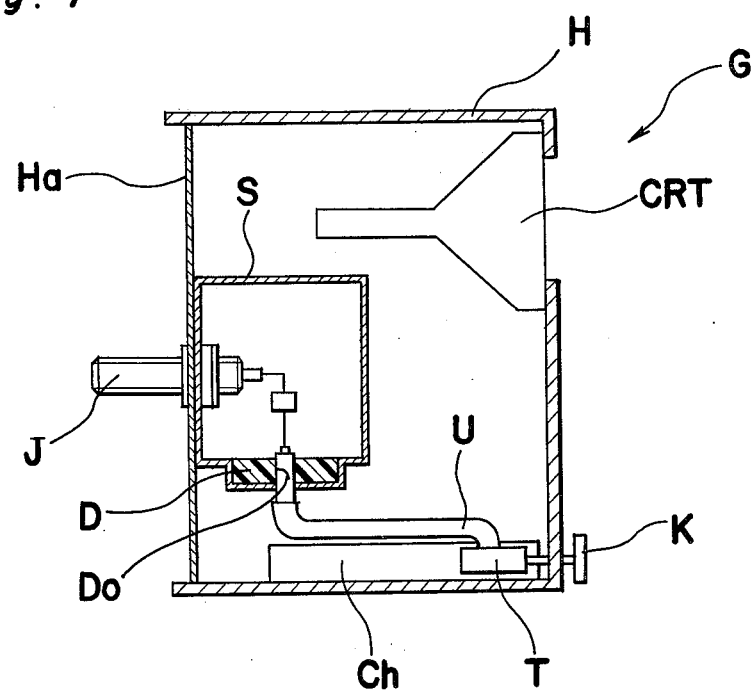
FIG. 1, previously referred to, is a schematic side sectional view illustrating one example of the construction of a television receiving set of a transformerless type to which the disc type CR composite part according to the present invention may be applied, FIG. 2(A), previously refered to, is a top or plan view of a conventional disc type CR composite part.
Figure 2A:
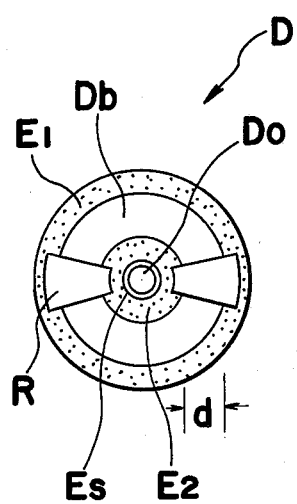
FIG. 2(B) is a bottom view of the conventional disc type CR composite part of FIG. 2(A)
FIG. 2(C) is a diametrical cross sectional view of the conventional disc type CR composite part of FIG. 2(A) taken through the centers of the resistor members.
Figure 2B:
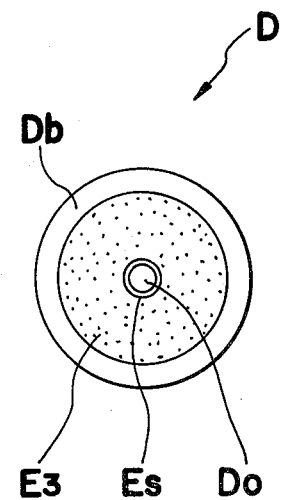
Figure 2C:
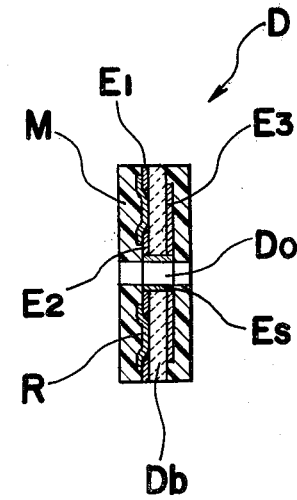
Figure 4:
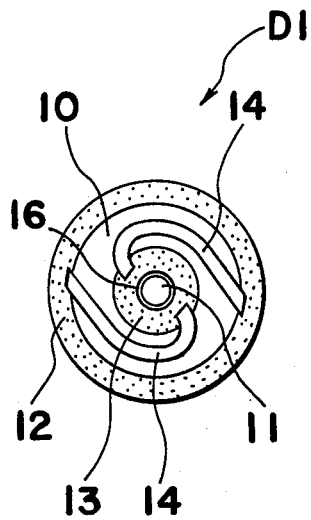
FIG. 4(A) is a top or plan view of an improved disc type CR composite part according to one preferred embodiment of the present invention.
FIG. 4(B) is a bottom view of the disc type CR composite part of FIG. 4(A)
FIG. 4(C) is a diametrical cross sectional view of the disc type CR composite part of FIG. 4(A)
Figure 4:
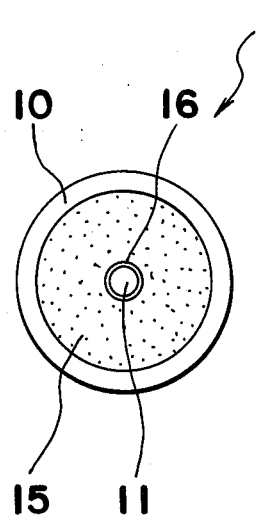
Figure 4:
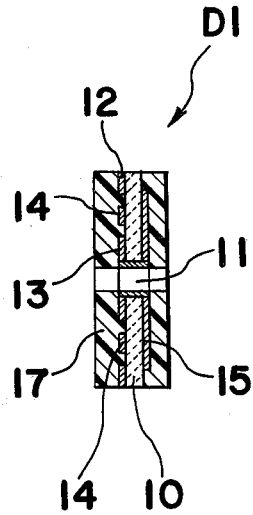

Referring again to the drawings, there is shown in FIGS. 4(A) through 4(C) an improved disc type CR composite part D1 according to one preferred embodiment of the present invention. The CR composite part D1 includes a disc-like substrate 10, for example, of ceramic dielectric material having a through-opening 11 formed at the central portion thereof, and a first electrode layer 12 provided adjacent to the peripheral edge of the substrate 10, a second electrode layer 13 concentrically provided around the through-opening 11 on one surface of the substrate 10, a third electrode layer 15 provided on the other surface of the substrate 10, and a shortcircuiting electrode 15 disposed in the through-opening 11 for short-circuiting the third electrode layer 15 and the second electrode layer 13, all of which are disposed in the similar manner as in the conventional arrangement of FIG. 2(A). As mentioned earlier with reference to FIG. 2(A), the shortcircuiting electrode 16 may be replaced by another electrode (not shown) provided on the peripheral edge of the substrate 10 for shortcircuiting between the third electrode 15 and first electrode 12 or by a metallic piece so mounted as to shortcircuit said electrodes. The CR composite part D1 of the present invention further includes a pair of curved long and thin resistor elements 14 respectively connected for bridging between the first and second electrode layers 12 and 13 in such a manner that said resistor elements 14 do not follow, in their disposition, the diametrical direction of the disc-like substrate 10 as is mostly clearly seen in FIG. 4(A). More specifically, each of the long and thin resistor elements 14 is connected, at its one end, to a corresponding portion at a confronting position of the second electrode 13, and extends in a curved manner over the surface of the substrate 10 between the first and second electrode layers 12 and 13 so as to be connected, at its other end, to a corresponding portion at a confronting position of the first electrode 12. In other words, each of the resistor elements 14 is so disposed as to extend for approximately half of the circumference over the surface of the disc-like substrate 10. For actual application, electrically insulating covering layers 17, for example, of epoxy resin and the like are further applied onto the substrate 10 at least to said one surface of the substrate 10.

Figure 3:
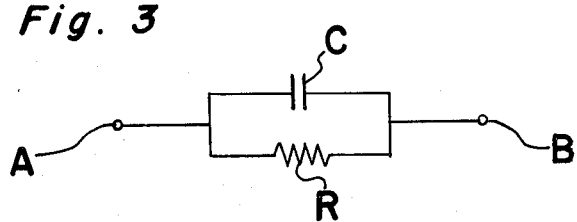
FIG. 3 is an electrical diagram showing an equivalent circuit of the CR composite part of FIG. 2(A)
Figure 5:
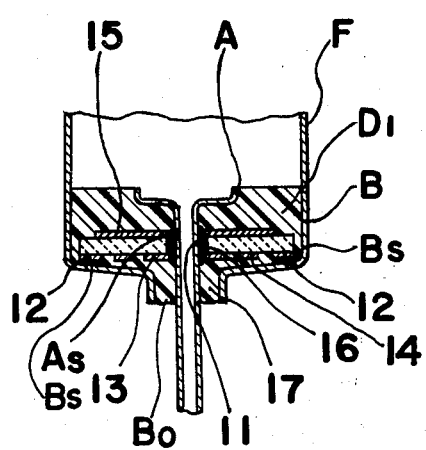
FIG. 5 is a fragmentary side sectional view showing an arrangement for actual application of the disc type CR composite part of FIG. 4(A)

It is noted that in the actual application, the CR composite part D1 of FIGS. 4(A) to 4(C) may be mounted, for example, in a metallic case F as shown in FIG. 5 for incorporating the whole assembly of the composite part D1 into a television receiving set or the like. The metallic casing F of FIG. 5 includes a cylindrical housing B in which the CR composite part D1 is accommodated at the lower portion above an opening Bo formed in the bottom of the housing B and soldered to the housing B as at Bs so as to serve for the terminal B in FIG. 3, and a central tube A extending through the through-opening 11 of the composite part D1 and the opening Bo of the housing B and soldered to the shortcircuiting electrode 16 as at As so as to serve as the terminal A in FIG. 3, with the electrically insulative layer 17 being formed at least on said one surface of the substrate 10 by applying epoxy resin or the like through the opening Bo. For forming the insulative layer 17 also over the third electrode layer 15 on the other surface of the substrate 10 depending on necessity, the epoxy resin and the like is applied from above the cylindrical housing B to such an extent as will become flush with the upper edge of the central tube A as in FIG. 5. Needless to say, the composite part D1 already formed with the insulating layer 17 on one or both surfaces of the substrate 10 as in FIG. 4(c) may be directly mounted in the cylindrical housing B without further application of the epoxy resin and the like through the opening Bo and from above the cylindrical housing B.

By the arrangement according to the present invention as described above, at any portion between the first and second electrode layers 12 and 13 in the diametrical direction of the substrate 10, the insulating covering layer 17 adheres well to the substrate 10 and is interposed between said first and second electrode layers 12 and 13 as is seen from FIG. 4(C). More specifically in FIGS. 4(A) to 4(C), the insulating covering layer 17 is present between the first electrode layer 12 and resistor element 14, and between the resistor element 14 and second electrode layer 13, and in the vicinity of end portions of the resistor elements 14 also, the insulative covering layer 17 is present at least between the resistor element 14 and either electrode layer 12 or 13.

According to the CR composite part of the present invention as described in the foregoing, there are present the portions where close adhesion between the dielectric substrate 10 and insulating covering layer 17 is available, i.e. portions having a large degree of insulation, at any portion of said one surface of the substrate 10 between the first and second electrodes 12 and 13 in the diametrical direction of said substrate, and therefore, the withstand voltage characteristics between the first and second electrode layers 12 and 13 can be markedly improved. Upon comparative measurements for A.C. breakdown voltage values taken on the conventional CR composite parts and CR composite parts of the present invention under the same conditions, the CR composite part according to the present invention could withstand the A.C. breakdown voltage as high as approximately 5.5 KV which is sufficient to withstand the flame test of CSA (Canadian Standards Association) standards. Furthermore, it has also been found that the CR composite part of the present invention is superior to the conventional CR composite part also in resistance variation rates after discharge tests respectively at 5 KV and 10 KV based on UL (Underwriters' Laboratories, Inc.) standards or CSA (Canadian Standards Association) standards as shown in the table below.

|  | Resistance variation rate | |
| --- | --- | --- |
|  | Conventional | Present Invention |
| 5 KV | Approx. - 15% | Approx. less than - 5% |
| 10 KV | Approx. - 17% | Approx. less than - 2% |

Furthermore, the present invention as described in the foregoing is extremely advantageous in its actual application in that, since the length of the resistor elements is substantially increased, it becomes possible to use materials having low resistance values per unit area, and thus, CR composite parts with stable quality can be obtained.

Figure 6:
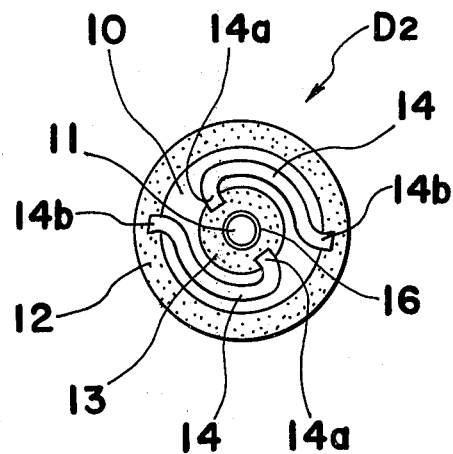
FIG. 6 is a view similar to FIG. 4(A), which particularly shows a modification thereof.

Referring to FIG. 6, there is shown a modification of the arrangement of FIGS. 4(A) to 4(C). In the modified CR composite part D2 of FIG. 6, the opposite end portions of each of the resistor elements 14 are modified to be further bent to provide straight portions 14a and 14b which are respectively connected to the first and second electrode layers 12 and 13 in the diametrical direction of the disc-like substrate 10 as far as practicable as shown, although the portion of each of the resistor element 14 between the straight portions 14a and 14b is disposed so as not to follow the diametrical direction of the substrate 10 as in the arrangement of FIGS. 4(A) to 4(C). The above arrangement of FIG. 6 is particularly effective for preventing very small discharge between the resistor elements 14 and respective electrode layers 12 and 13, which is liable to take place when the connections therebetween are made slantwise at acute angles.

Although the present invention has been fully described by way of example with reference to the accompanying drawings, it is to be noted that various changes and modifications are apparent to those skilled in the art. For example, the configuration of the ceramic dielectric substrate may be modified into any shapes such as square, rectangular or polygonal configurations, and the shapes, number or length of the resistor elements are not limited to those in the foregoing embodiments, but may be varied in various ways so far as these resistor elements are so provided that the insulative covering layer is always present at any portion on the one surface of said substrate between the first and second electrode layers in the diametrical direction of the substrate. Therefore, unless otherwise such changes and modifications depart from the scope of the present invention, they should be construed as included therein.

What is claimed is:

1. An electrical composite part for use in electrical and electronic equipment, comprising:
   a generally cylindrical substrate of ceramic dielectric material having first and second opposed major surfaces and a through-opening formed at its central portion, said through-opening extending between said first and second major surfaces;
   first and second electrodes provided on said first surface of said substrate and located adjacent to the outer periphery and around said through-opening, respectively;
   a third electrode provided on said second surface of said substrate;
   means for shortcircuiting said third electrode to one of said first or second electrodes;
   resistor means connected between said first and second electrodes so as to extend over said first surface of said substrate in an indirect path between said first and second electrodes; and
   an electrically insulating covering layer formed on said first surface of said substrate, the location of said resistor means being such that said electrically insulating covering layer is directly adjacent at least a portion of said first surface along all diameters of said cylindrical substrate.

2. A disc type CR composite part for use in electrical and electronic equipment which comprises:
   a disc substrate of ceramic dielectric material having first and second opposed surfaces; a through-opening formed at the central portion of said substrate and extending from said first to said second surface;
   first and second electrodes provided on said first surface and located adjacent to the outer periphery and around said through-opening of said substrate, respectively;
   a third electrode provided on said second surface of said substrate;

means for selectively shortcircuiting said third electrode with one of said first and second electrodes;

resistor elements connected between said first and second electrodes and shaped to have extensive central portions that extend over said first surface of said substrate in a non-diametrical direction of said substrate; and an electrically insulating covering layer formed at least on said one surface of said substrate, the path of said resistor means being such that said electrically insulating covering is directly adjacent to at least a portion of said first surface along all diameters of said disc substrate.

3. A disc type CR composite part as claimed in claim 2, wherein said shortcircuiting means is a short-circuiting electrode provided in said through-opening for shortcircuiting said third electrode with said second electrode.

4. A disc type CR composite part as claimed in claim 2, wherein said shortcircuiting means is a short-circuiting electrode provided around the peripheral edge of said substrate for shortcircuiting said third electrode with said first electrode.

5. A disc type CR composite part as claimed in claim 2, wherein said resistor elements are each provided, at opposite ends of said central portion, with straight portions which are respectively connected to said first and second electrodes in the diametrical direction of said substrate as far as practicable.

6. A disc type CR composite part as claimed in claim 2, further including a metallic casing having an outer cylindrical member and an inner tube member, said disc type CR composite part being accommodated at the lower portion inside said outer cylindrical member in a position above a lower opening formed at the bottom portion of said outer cylindrical member, with said first electrode layer of said disc type CR composite part being soldered to said outer cylindrical member which serves as one terminal of said CR composite part, said inner tube member extending through said through-opening and said lower opening of said outer cylindrical member, with said shortcircuiting means being soldered to said inner tube member which serves as the other terminal of said CR composite part.

7. A disc type CR composite part as claimed in claim 2, further including a metallic casing having an outer cylindrical member and an inner tube member, said disc type CR composite part being accommodated at the lower portion inside said outer cylindrical member in a position above a lower opening formed at the bottom portion of said outer cylindrical member, with said first electrode layer of said disc type CR composite part being soldered to said outer cylindrical member which serves as one terminal of said CR composite part, said inner tube member extending through said through-opening and said lower opening of said outer cylindrical member, with said shortcircuiting means being soldered to said inner tube member which serves as the other terminal of said CR composite part.

8. A disc type CR composite part as claimed in claim 7, wherein said second surface of said substrate is also formed with said electrically insulating covering layer by applying insulating material onto said the other surface from the side of the outer cylindrical member opposite to said lower opening.

9. A disc type CR composite part as claimed in claim 2, wherein for each of said resistor elements its first end is connected to said first electrode at a point angularly offset from the point at which the second end of said resistor element is connected to said second electrode.

10. Apparatus comprising:
(A) a disc type CR composite part for use in electrical and electronic equipment, said disc type composite part comprising:
(1) a disc shaped substrate of ceramic dielectric material having first and second opposed surfaces;
(2) a through-opening formed in the central portion of said substrate and extending from said first to said second surfaces;
(3) first and second electrodes provided on said first surface and located adjacent to the outer periphery and around said through-opening of said substrate, respectively;
(4) a third electrode provided on said second surface of said substrate;
(5) means for selectively shortcircuiting said third electrode with one of said first and second electrodes;
(6) resistor elements connected between said first and second electrodes and shaped to have extensive central portions that extend over said first surface of said substrate in a non-diametrical direction of said substrate; and
(7) an electronically insulating covering layer formed at least on said one surface of said substrate; and
(B) a metallic casing having an outer cylindrical member and an inner tube member, said disc type CR composite part being accommodated at the lower portion inside said outer cylindrical member in a position above a lower opening formed at the bottom portion of said outer cylindrical member, with said first electrode layer of said disc type CR composite part being soldered to said outer cylindrical member which serves as one terminal of said CR composite part, said inner tube member extending through said through-opening in said lower opening of said outer cylindrical member, with said shortcircuiting means being soldered to said inner tube member which serves as the other terminal of said CR composite part.

11. Apparatus comprising:
(A) a disc type CR composite part for use in electrical and electronic equipment, said disc type composite part comprising:
(1) a disc shaped substrate of ceramic dielectric material having first and second opposed surfaces;
(2) a through-opening formed in the central portion of said substrate and extending from said first to said second surfaces;
(3) first and second electrodes provided on said first surface and located adjacent to the outer periphery and around said through-opening of said substrate, respectively;
(4) a third electrode provided on said second surface of said substrate;
(5) means for selectively shortcircuiting said third electrode with one of said first and second electrodes;
(6) resistor elements connected between said first and second electrodes and shaped to have extensive central portions that extend over said first surface of said substrate in a non-diametrical direction of said substrate; and (7) an electronically insulating covering layer formed at least on said one surface of said substrate; and (B) a metallic casing having an outer cylindrical member and an inner tube member, said disc type CR composite part being accommodated at the lower portion inside said outer cylindrical member in a position above a lower opening formed at the bottom portion of said outer cylindrical member, with said first electrode layer of said disc type CR composite part being soldered to said outer cylindrical member which serves as one terminal of said CR composite part, said inner tube member extending through said through-opening and said lower opening of said outer cylindrical member, with said shortcircuiting means being soldered to said inner tube member which serves as the other terminal of said CR composite part.

12. Apparatus according to claim 11, wherein an insulating covering layer is also formed on said second surface of said substrate.

* * * * *